(12) United States Patent
Eichenlaub

(10) Patent No.: US 6,734,838 B1
(45) Date of Patent: May 11, 2004

(54) ENHANCED RESOLUTION FOR IMAGE GENERATION

(75) Inventor: Jesse B. Eichenlaub, Penfield, NY (US)

(73) Assignee: Dimension Technologies Inc., Rochester, NY (US)

(*) Notice: Subject to any disclaimer, the term of this patent is extended or adjusted under 35 U.S.C. 154(b) by 0 days.

(21) Appl. No.: 09/313,953

(22) Filed: May 18, 1999

Related U.S. Application Data

(60) Provisional application No. 60/085,612, filed on May 18, 1998.

(51) Int. Cl.[7] .................................................. G09G 3/36
(52) U.S. Cl. ........................ 345/87; 345/8; 345/88; 345/97; 353/22; 353/23; 353/24; 349/5; 349/6; 349/7
(58) Field of Search ................ 345/87, 88, 97, 345/8; 430/20, 24; 353/22, 23, 24; 349/5, 6, 7

(56) References Cited

U.S. PATENT DOCUMENTS

| | | | |
|---|---|---|---|
| 5,036,385 A | | 7/1991 | Eichenlaub |
| 5,428,366 A | | 6/1995 | Eichenlaub |
| 5,444,551 A | * | 8/1995 | Miller et al. ............... 358/456 |
| 5,581,385 A | * | 12/1996 | Spitzer et al. .............. 349/58 |
| 5,616,912 A | * | 4/1997 | Robinson et al. ......... 250/201.1 |
| 5,673,059 A | * | 9/1997 | Zavracky et al. .............. 345/8 |
| 5,817,255 A | * | 10/1998 | Tanaka et al. ............... 252/582 |
| 5,822,021 A | * | 10/1998 | Johnson et al. ............. 348/742 |
| 5,847,784 A | * | 12/1998 | Finnila et al. ................. 349/73 |
| 5,949,503 A | * | 9/1999 | Koyama et al. ............... 349/41 |
| 6,017,123 A | * | 1/2000 | Bleha et al. .................. 353/30 |
| 6,052,231 A | * | 4/2000 | Rosenbluth ................. 359/636 |
| 6,053,615 A | * | 4/2000 | Peterson et al. .............. 353/58 |
| 6,120,152 A | * | 9/2000 | Nakayama et al. ........... 353/31 |
| 6,249,378 B1 | * | 6/2001 | Shimamura et al. ......... 359/487 |
| 6,331,878 B1 | * | 12/2001 | Takahara ....................... 349/5 |
| 6,333,770 B1 | * | 12/2001 | Omae et al. .................. 349/86 |
| 6,368,760 B1 | * | 4/2002 | Nishiguchi ................... 430/20 |

* cited by examiner

Primary Examiner—Richard Hjerpe
Assistant Examiner—Abbas Abdulselam
(74) Attorney, Agent, or Firm—Stephen B. Salai, Esq.; Donna P. Suchy, Esq.; Harter, Secrest & Emery LLP

(57) ABSTRACT

Images with enhanced resolution are created with a display device comprising a non-transmissive light valve including addressable pixels, a light source that directs light to the light valve, and a lens positioned between the light valve and the light source, the lens directing light from the light source to the pixels on the light valve and the light valve directing light to viewing optics. The light valve is an integrated circuit ferroelectric liquid crystal device (ICFLCD), or other light valve arrays such as a digital light processor (DLP) display, having an array of addressable pixels. Such light valves may be mounted in a head mounted display.

44 Claims, 9 Drawing Sheets

ENHANCED RESOLUTION FOR IMAGE GENERATION

This application claims priority of prior provisional application Ser. No. 60/085,612, filed May 18, 1998, the disclosure of which is incorporated herein by reference.

FIELD OF THE INVENTION

This invention relates to a display device that creates very high resolution real time images. Several subregions within individual pixels of a display are illuminated in rapid succession while changing the transparency of each pixel as necessary just prior to each illumination period, thus creating an image made of the illuminated subregions instead of the pixels themselves. More particularly, this invention relates to an optical and illumination system that can be used to accomplish such sub pixel illumination, especially in combination with a reflective integrated circuit ferroelectric liquid crystal display (ICFLCD) or other reflective light valve arrays such as a digital light processor (DLP) display.

BACKGROUND OF THE INVENTION

U.S. Pat. No. 5,036,385 (Eichenlaub) discloses an optical and illumination system whereby subregions of a transmissive LCD may be illuminated in succession so as to produce an image made of the subregions instead of the pixels themselves. The produced image thus may have a much higher resolution than the LCD itself. Furthermore, U.S. Pat. No. 5,410,345 (Eichenlaub) discloses a detailed construction and operation of an illumination system and optics that may be used to illuminate several subregions of each pixel in succession. U.S. Pat. No. 5,428,366 (Eichenlaub) discloses an optical and illumination system that can create high resolution color images that do not display color breakup by illuminating subregions of pixels in succession. The aforementioned devices were designed primarily with a transmissive, direct view LCD as the light valve.

There are now available a new class of light valves that are designed primarily for head mounted and projection applications. These devices, though relying on different, specific optical technologies to operate, are reflective, are miniature devices (e.g., measuring less than 20 mm on a side and possession pixels that are less than 20 microns on a side), and possess extremely fast address and pixel response rates. There are also various monochrome devices, with color images typically being created by field sequential color illumination or by combining the images of three displays, each illuminated by a different color. Examples are ICFLCDs and other non-transmissive LCDs. However, the optical and illumination system of the aforementioned Eichenlaub patents are not readily adaptable to such newer classes of light valves since they are non-transmissive to light.

Simple mathematics tells one that the display of images with resolution matching the eye's limit and having a sufficiently wide field of view (FOV) for head mounted device (HMD) applications requires an extremely high resolution display. The eye can resolve to less than 1 minute of arc, depending on ambient light, color, and other factors. One minute of arc will be used for illustrative purposes. A device that is capable of displaying one minute resolution would be made up of red, green, and blue pixel triads that subtend no more than ½ minute of arc. A display with pixels subtending ½ minute of arc and covering 80 degrees horizontally (the minimum that is considered acceptable, with 180 degrees or more considered the optimum), and somewhat less vertically (this would be 60 degrees for a display with a typical width to height ratio) would have a total resolution of 9600 triads by 7200 triads. Clearly such a display is far beyond the current state-of-the-art. Approximately 2000×2000 resolution is the best that has been attained on real time displays. 1280×1024 resolution is the highest available in commercial virtual reality systems using miniature cathode ray tubes (CRTs). The resolution of the more compact and lighter weight LCD based systems is much lower. Thus a state-of-the-art virtual reality display possesses less than 1/50th the number of pixels required for the vision limited resolution display just described.

One company, LEEP Systems, currently makes optics that partially overcome this problem by distorting the display—keeping it compressed and thus providing high angular resolution in the center, while stretching it at the edges to provide as much of a peripheral view as possible. Software corrects for this distortion on the image itself, which is rendered as a fish eye image on the display and looks normal when viewed through the optics. Resolution at the center of the FOV is improved by a factor of three. Since the human visual system can perceive high resolution only near the gaze point, and since an observer typically spends most of the time looking straight ahead, this system provides some improvement over other devices.

Recently, it has been proposed to incorporate high resolution inserts spanning 5 to 30 degrees (the best size to be determined experimentally) within low resolution LCD images. The high resolution inserts, if small enough could approach the human eyes resolution limit. The proposed system requires four LCDs, and would be rather bulky, with the extra LCDs mounted above or to the side of the user's head. Moving inserts have been implemented in helmet displays, where two helmet displays provide movable high resolution inserts within low resolution images by means of eye trackers, movable mirrors, and two thick fiber optic cables extending to remote displays and optics. Thus, such approaches to achieve eye limited resolution in HMD systems require bulky, heavy equipment that involves high resolution inserts in lower resolution fields.

Accordingly, it is an object of this invention to provide an optical and illumination system that may be used to accomplish sub pixel illumination with a reflective ICFLCD or other reflective light valve, and especially, illumination of subpixel regions in rapid succession.

It is another object of this invention to provide a display device that creates very high resolution real time images, including higher resolution than obtainable with the devices described in the aforementioned Eichenlaub patents.

It is another object of this invention to provide an optical and illumination system that may be used to direct light efficiently from a reflective light valve to a projection lens, in the case of a projected image, or to an eyepiece, in the case of a head mounted system.

It is another object of this invention to provide a relatively light weight LCD-based display device which can produce very high resolution images across the entire field without inserts, cumbersome equipment, or eye trackers.

It is yet another object of this invention to provide displays and associated optics systems that are higher in resolution, yet lighter in weight than present CRT imaging systems and roughly the same size as present LCD based virtual reality (VR) displays.

SUMMARY OF THE INVENTION

This invention provides a display device comprising: a non-transmissive light valve including addressable pixels; a light source that directs light to the light valve; and a lens positioned between the light valve and the light source, said lens directing light from the light source to the pixels on the light valve and the light valve directing light to viewing optics. Preferably, the light valve is an integrated circuit ferroelectric liquid crystal device, or other light valve arrays such as a digital light processor (DLP) display, having an array of addressable pixels.

The device may include a flys eye lens or lenticular lens adjacent the light valve, for example, the lens may be contained in a front transparent layer of an ICFLCD, with a layer of liquid crystal material arranged beneath the front transparent layer, and a reflective layer arranged beneath the liquid crystal material layer. Alternately, a flys eye lens or a lenticular lens may be spaced from the light valve, for example, a relay lens may be disposed between an ICFLCD and a flys eye or lenticular lens array.

Preferably, the device includes a reflector such as a partially reflective mirror positioned between the light source and the light valve, the reflector directing light from the light valve to viewing optics.

Light from the light source may be directed through a rotating color filter wheel comprising discrete sections of different color transparencies, in which case light from the color wheel may be received by a rotating prism. The focused beam of light from the prism may be directed to bundle ends of optical cables, with opposite bundle ends of the optical cables directing the focused beam of light to the light valve. Alternately, the light source may include individual sources of red, green and blue colored light, where the individual sources of light are synchronized to emit light of different colors in succession.

The invention also provides a head mounted display system comprising: a right eye light valve and a left eye light valve mounted in a head mounted display, each light valve being nontransmissive and including an array of addressable pixels; and an illumination system that provides focused light beams of different transparencies to each of the light valves, wherein the focused beams are provided alternately to the light valves, and the each light valve is addressed while receiving no light. The display system preferably includes a light source external of the head mounted device, where light from the light source is directed to the light valves via optical cables. The light source may include a rotating color filter wheel comprising discrete sections of different color transparencies, employed in conjunction with a rotating prism that receives light from the color filter wheel and creates a focused beam of light directed to bundle ends of optical cables, with opposite bundle ends of the optical cables directing the focused beam of light to the light valve.

According to other aspects of the invention, there is provided a method of generating color images of high resolution, comprising: sequentially directing light of different colors from a light source to pixels on a non-transmissive light valve; and addressing the pixels of the light valve to modulate intensity of light to create different color components of an image in succession.

BRIEF DESCRIPTION OF THE DRAWINGS

FIGS. 10a to 10c illustrate a sequential pattern of lines generated during scanning of pixels.

DETAILED DESCRIPTION OF THE PREFERRED EMBODIMENTS

LCDs are unique in that they do not form images by emitting light. Rather, they act as light valves to vary the intensity of light passing through them in order to form an image. This light can be emitted by a backlighter behind the LCD, or can be ambient illumination reflected by a mirror behind the LCD. An effective method of increasing the resolution of a liquid crystal display involves the use of changing the patterns of light emitting regions which sequentially illuminate subsections of each pixel. The basics of the operation of the system are described in U.S. Pat. No. 5,036,385, the disclosure of which is incorporated herein by reference.

Figure 1:
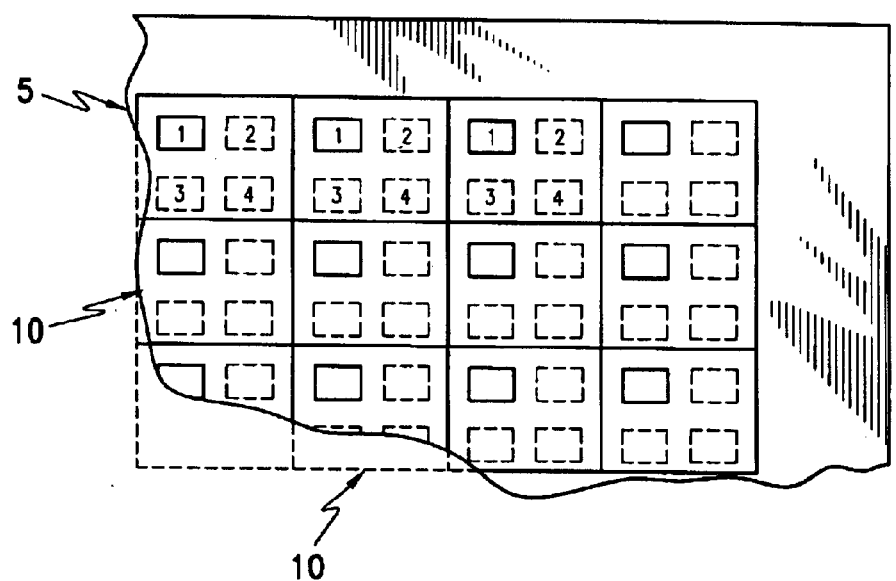
FIG. 1 is a view of a section of a transmissive LCD where different subregions of each pixel can be illuminated in a sequence.
Figure 2:
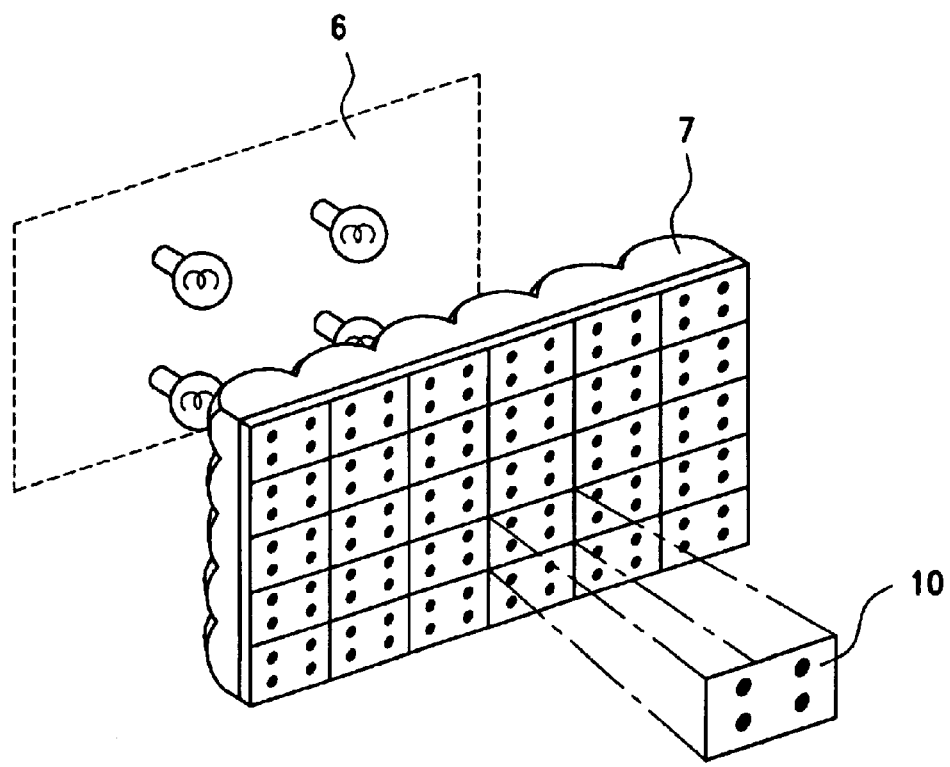
FIG. 2 is an illumination system involving lamps and flys eye lenses that can be used to direct light into the pixel subregions shown in FIG. 1.

Referring to FIGS. 1 and 2, light emitting regions 1, 2, 3, 4 are either situated a short distance behind the transmissive LC layer 5 of the display, or are projected onto the LC layer by appropriate optics. Although four regions are used in this example, in theory, any number can be used. Light emitting regions 1, 2, 3, 4 turn on and off in succession, so that first set of lights 1 is turned on, then this set of lights turns off and a set of lights 2 turns on, and this set of lights turn off and a set of lights 3 turn on, and so forth. When the set of lights 1 is on, the transparency of each pixel 10 on the LCD is changed to provide the correct apparent brightness for each of the illuminating regions so that an observer sees a partial image composed of regions 1. When the set of lights 2 is on, each pixel again changes its transparency so that the observer sees different parts of the same image made up of regions 2, and so on with the set of lights 3, 4. During each cycle, through the operation of the light emitting regions 1, 2, 3, and 4 in conjunction with the LCD, a complete image with resolution 2X×2Y is built up from the interaction of the X×Y resolution LCD and the pattern generated by light emitting regions 1, 2, 3, 4.

The light points can be generated by means of a small number of flashing light sources (in this case four) used in combination with a flys eye lens, in an arrangement similar to that shown in FIG. 2. According to this arrangement, one flys eye lens 7 is situated behind each pixel 10 of the LCD. As the light sources 6 flash on and off in their succession, their light is focused sequentially into four sets of light spots within the LCD pixels, as shown. It has been successfully demonstrated, using bright LEDs as the light sources, that this basic technique may create 256×256 images on a 128×128 pixel ferroelectric LCD that may operate at a speed of over 200 fields per second (fps). Although the light emitting regions shown are squares arranged in a grid pattern, in principle, other shapes and arrangements may be used.

However, the resolution obtainable using this method is dependent on, and has been limited by, the response speed of the transmissive LCD.

Figure 3:
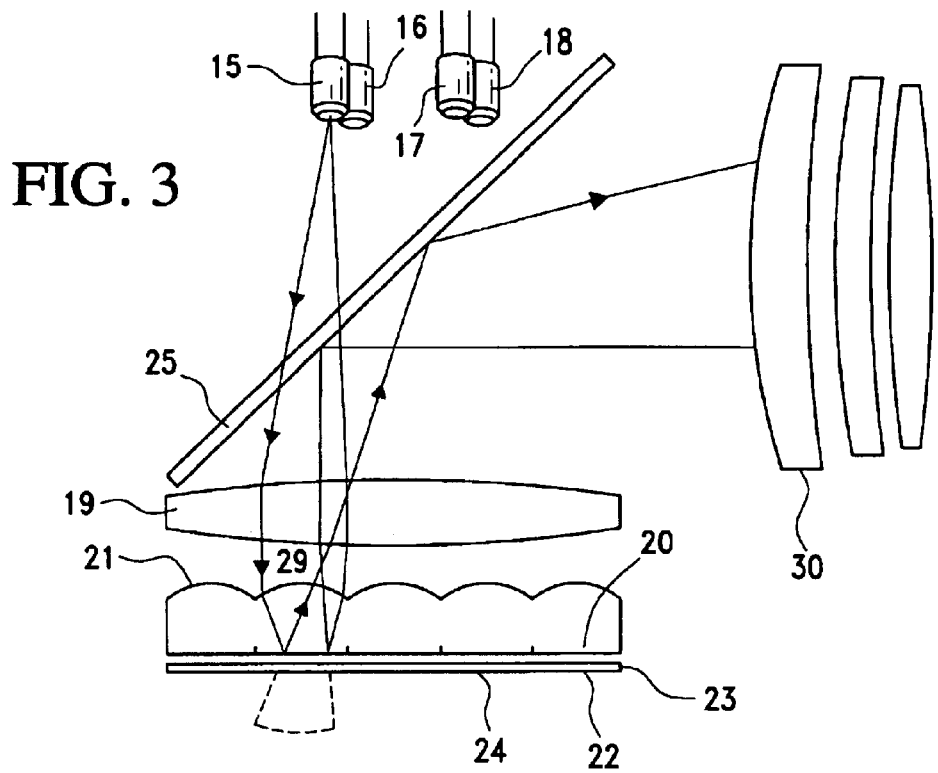
FIG. 3 illustrates an illumination and optical system according to this invention.

A first embodiment of this invention is illustrated in FIG. 3. According to the illustrated embodiment, four point-like light emitting sources 15, 16, 17, 18, in the form of fiber optics bundles, are provided. Of course, other numbers or types of light emitting sources could be employed, such as LEDs. Light sources 15, 16, 17, 18 are placed behind a field lens 19 and a flys eye lens 20. Flys eye lens 20 may consist of a sheet of glass or plastic having lenslets 21. A non-transmissive, reflective LCD 23, in this case an ICFLCD, is positioned adjacent the flys eye lens 20. A partially reflective mirror 25 is positioned between the light sources and the field lens 19. Mirror 25 may be a half-silvered mirror, or preferably, a polarizing beam splitter which transits light polarized in one direction and reflects light polarized the orthogonal direction. LCD 23 includes pixels 24. The size and arrangement of the flys eye lenslets 21 are such that one lenslet is situated in front of each pixel 24.

Lenslets 21 may be spherical with rows and columns of lenslets having a pitch equal to that of the LCD pixels 24. The curvature of each lenslet 21 is such that its focal length is ideally twice the distance between the lens 20 and the reflective surface 22 of the reflective LCD 23. The field lens 19 preferably has a focal length equal to the distance between it and the light sources, and is placed directly in front of the flys eyes lens 20.

Light focused by each lenslet 21 passes through the LCD layer of the pixel 24 behind it and reflects back out through the lens, forming images of the light emitters near the lens surface, as shown in FIG. 3. One such image 29, of light source 15, is shown. Each lens "sees" an image of itself behind the reflective surface 22 of the LCD at a distance of one focal length. The lens thus creates an image of itself and the light coming through it an infinity. Since all the images created by all the lenses are at infinity, they will be coincident. The field lens 19 in turn causes this area at infinity to be refocused into a single small square area at one focal length from itself. Due to the partially reflective mirror 25, half of the light exiting the reflective LCD 23 is redirected into the viewing optics 30. With appropriate design, the square area into which the light is focused may be smaller than and coincident with the entrance pupil of the viewing optics. This results in highly efficient use of light compared to typical LCD based HMD systems which illuminate the LCD with diffuse light, most of which misses the viewing optics.

Light emitting regions 5, 6, 7, 8 turn on and off in succession, causing light spots in front of each lenslet to turn on and off in succession. The LCD 23, through which the light passes, is used to modulate the intensity of the light to provide the appropriate gray levels to each spot. Thus, an image made up of the light spots is built during each four-flash cycle.

With proper sequencing of the illuminating regions, an LCD operating at N×30 frames per second can form almost flickerless images that have a resolution N times greater than the LCD itself. Accordingly, the faster the LCD, the more image sub-fields that can be displayed in ⅟30th second, and the greater the resolution increase. The ICFLCD employed as reflective LCD 23 may have a pixel response time on the order of 0.1 ms and may be addressed at rates of up to 10,000 scans per second, yielding a completely different image with each scan and address. Thus, very high resolution images may be created using the sub-pixel illumination method and a reflective LCD.

ICFLCDs, DLPs (such as those manufactured by Texas Instruments) and other fast reflective light valves are monochrome devices. The preferred method of creating color images with these devices is the use of field-sequential color (FSC) illumination. According to this method, and referring to FIG. 3, light sources 15, 16, 17, 18 are caused to emit light of red, green, and blue color, in succession during subsequent fields, and the pixel transparencies of LCD 23 are changed to create red, green, and blue color components of an image in succession. This latter method has the advantage of high light throughout efficiency and low cost.

Figure 4:
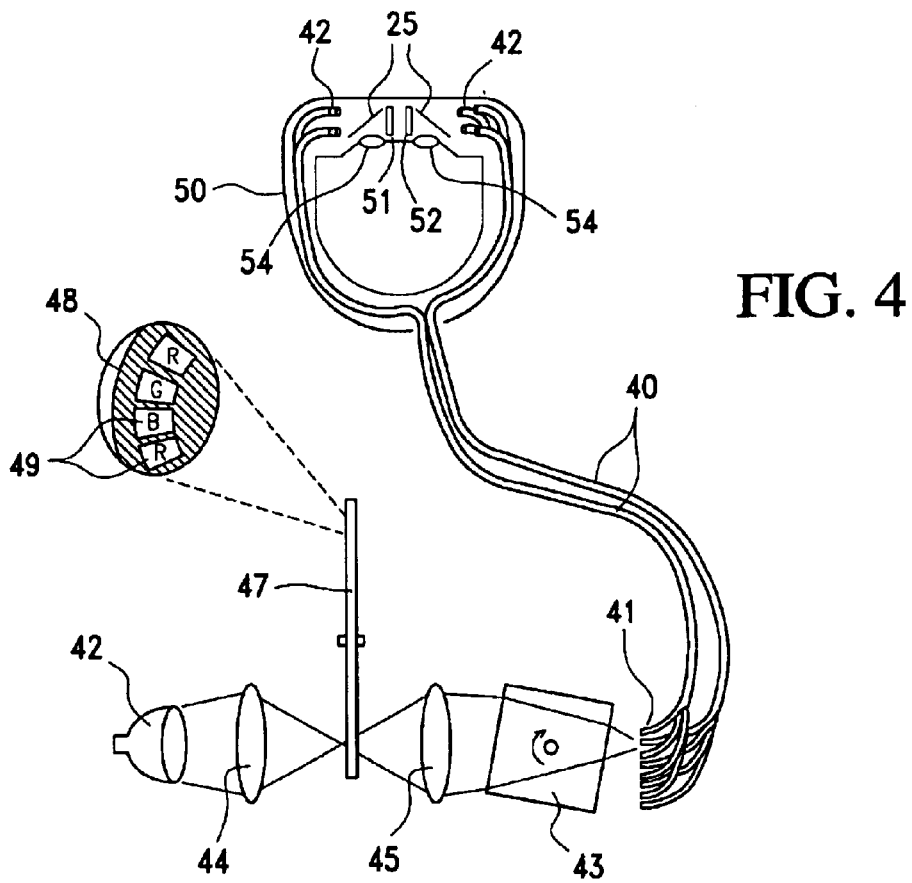
FIG. 4 illustrates an illumination and optical system in conjunction with a head mounted display.

An alternate illumination system for color generation and increased resolution is illustrated in FIG. 4. An advantage of this system is its ability to generate the very bright, very rapid flashing light sources desired for high resolution HMD applications. Eight bundle ends 41 of fiber optic cables are aligned in a row, and light from a halogen lamp or similar light source 42 is focused onto the bundle ends 41 via focusing lenses 44 and 45 and a rotating prism 43.

Alternately, a rotating mirror could be used in place of prism 43. The rotating prism 43 serves to scan the beam across the bundle ends 41 as shown. Interposed between light source 42 and rotating prism 43 is a color filter wheel 47 containing discrete regions of red, green and blue, an exploded section 48 of color filter wheel 47 also being schematically illustrated in FIG. 4.

The bundles are routed into the rear of the head mounted device (HMD) 50 and then split. One set of bundle ends 42 is directed to a left eye ICFLCD system 51, and the alternate bundles ends 42 are directed to a right eye ICFLCD system 52. Partially reflective mirrors 25 may be disposed between each set of bundle ends and the ICFLCD systems 51 and 52. The ICFLCD systems 51 and 52 may each include an ICFLCD, a flys eye lens and a field lens as in the system illustrated in FIG. 3.

In operating the system of FIG. 4, it is important that each ICFLCD 51, 52 receives no light during certain periods. While an ICFLCD is receiving no light, this LCD can be addressed and the pixels changed between fields to prevent blurring the image. Therefore, a gap is placed between the bundle ends 41 at the same side where they are illuminated by the light from the prism 43, so that as the beam exiting the prism passes through this gap between the bundle ends, no illumination enters the bundle ends and illuminates the ICFLCD.

Four bundles for each of cables 40 are illustrated in the described embodiment, but any number could be used, depending on how many light emitting sources it is desired to create in front of the reflective LCD. The bundles need not be large, for example, the bundle ends 41 may be on the order of 5 mm in diameter, given a typical light source.

If a large number of bundles is used, placing the bundle ends 41 in two or more rows may provide for a significantly more compact arrangement, but would require employing a beam scanner 43 that is a two (or multi) axis beam scanning system. At the other end, in the HMD 50, the bundle ends 42 may be rearranged to form square patterns, so that as the light beam scans the bundle ends, different corners of the square alternately light up and turn off. If more bundles were used, such as 9 or 16, squares of ends could be formed in front of each ICFLCD 51, 52, and the lighted area made to scan across each row of ends in sequence. The ends 42 may be lighted in any other order by rearranging them.

Color filter wheel 47 contains multiple sections 49 along its edge within which are mounted sets of red, green, and blue color filters of different transparencies. The wheel rotates in synchronization with the rotation of prism 43 so that a complete set of red, green, and blue color filters of each transparency level (or gray level) is brought in front of the focused beam during the illumination of each of the fiber optic bundles. The rotation rates of the prism and filter need not be excessive. As an example, if the filter wheel 48 has four sets of red, green, and blue filters, it may rotate at 5400 rpm, with the prism 43 rotating at 450 rpm, in the case where a twelve-fold resolution increase is desired. As an alternative to the color filter wheel, a liquid crystal electrooptical filter may be employed which changes its filtering characteristics rapidly to transmit red, then green, then blue light in succession. Such a filter, possessing the color changing speed necessary for this purpose, is made by Displaytech.

The illumination system illustrated in FIG. 4 may be employed with displays other than HMDs but this system offers advantages for HMD applications in that it is relatively compact and lightweight. Other technologies using miniature bright light sources may be practical in the future, allowing a more compact lighting system to be mounted within the helmet itself. Light sources include LED, electroluminescent, miniature fluorescent, and cathode luminescent lights, each of which represents potential light sources for this type of system, depending on the brightness and speed requirements.

When it is desired to create color images using FSC illumination, field-sequential sub-images representing different color components must be created to obtain a full color image. Thus, competition exists between the sub-images for available time necessary to represent color and increased resolution. Despite these tradeoffs, ICFLCDs still posses a greater potential for resolution increase than any other variation of LCD technology currently available.

As mentioned, ICFLCD systems 51 and 52 may each include an ICFLCD, a flys eye lens and a field lens as in this system illustrated in FIG. 3. An important design consideration is the need to place the flys eye lenslets very close to the pixels of the light valve. This is due to the small size of the pixels, and it is necessary to focus light into spots that are considerably smaller than the pixels themselves. Unfortunately, the smallest possible size of a light spot is limited by the size of the airy disk formed by the lens when imaging a pointlike light source. For example, the diameter of this disk in microns out to the first minimum, for yellow-green visible light at a wavelength of 0.56 microns is related to the diameter of the lens forming it and the focal length of the lens by the formula $D = 2 \times F \times \tan(1.22 \times 0.56/D)$. The smaller the lens and the longer the focal length, the larger the minimum spot size. Since the pixels and lenses of the types of systems described are typically less than 20 microns on a side, a very short lens focal length, and thus a very short lens to pixel distance, is necessary to create sufficiently small spots on the order of 5 mm diameter. Since the light sources will always have some angular extent, an even smaller airy disk size is required. Given the typical light valves on the market today, with pixels sizes of around 12 microns, a lens to pixel distance on the order of 30 microns must be used.

Figure 5:
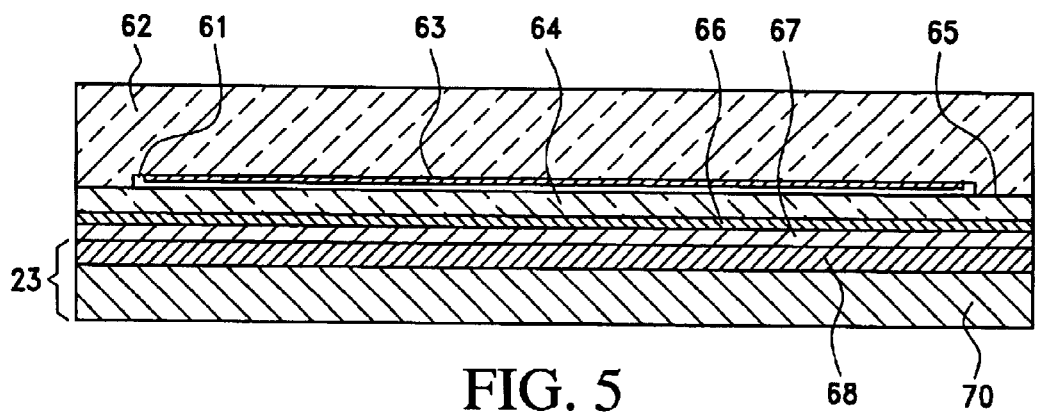
FIG. 5 is a cross-sectional view of a construction of an ICFLCD and lens assembly.
Figure 6:
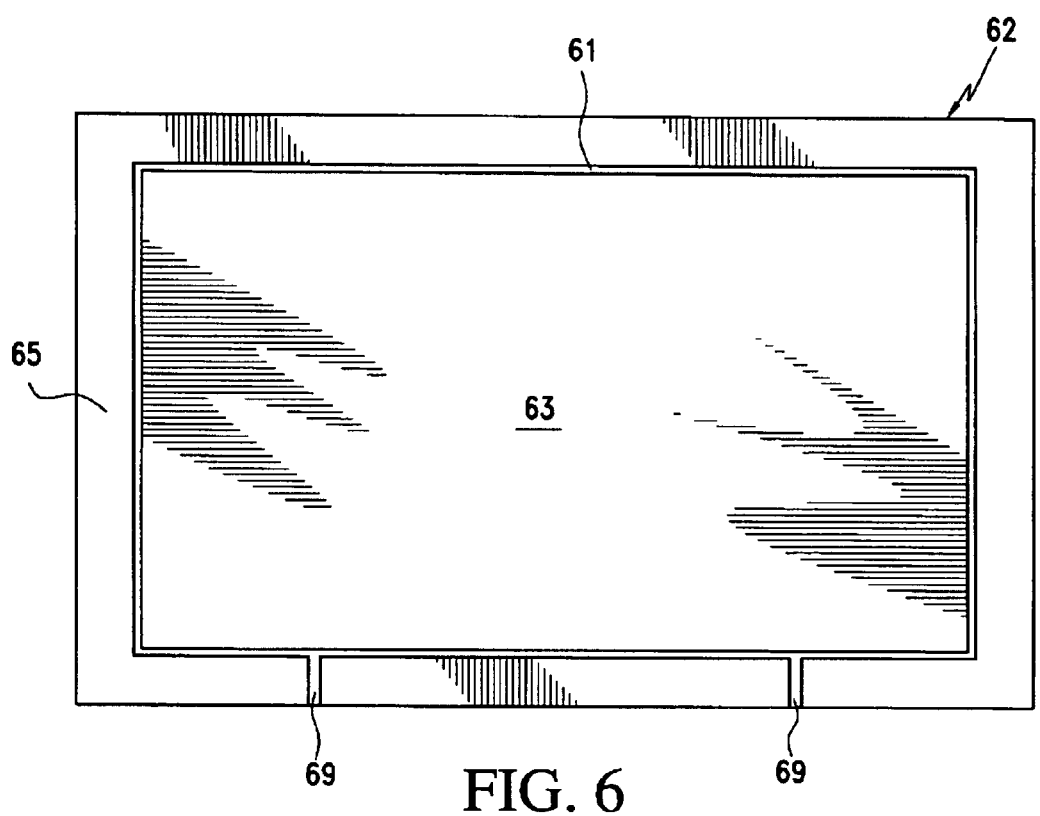
FIG. 6 is a top view of the construction of FIG. 5.

The front glass of ICFLCD light valves, and the protective glass of other types of reflective light valves, is typically much thicker than this dimension. Thinner glass presents difficulties due to handling and ease of breakage. However, a suitable construction that addresses these problems is illustrated in FIGS. 5 and 6. A very shallow well 61, typically no more than 1 micrometer deep, is formed in a relatively thick piece of glass 62, for example, using an etching process. An array of flys eye lenslets 63 is formed on the surface of glass 62 within the well 61, for example, by a similar etching process. Ideally, the highest points on the lenslets 63 would be raised only slightly less that the border 65 surrounding the well. A second, very thin piece of glass 64 is placed over the well of the first piece of glass 61, and attached at the border 65 around the outside of the well 61. In addition to the well, a series of the channels 69, such as those shown, are etched between the well and the edges of the glass pieces 61, 64. These channels permit evacuation of air during those steps of the ICFLCD manufacturing and assembly process, such processes typically requiring forming a vacuum. A conductive ITO layer 66 is placed on the exposed surface of the thin glass piece 64. Alignment marking may be etched into one of the glass pieces to assist in alignment of the lenslets and the pixels of the ICFLCD. The whole assembly would be mounted to the front of the ICFLCD 23, with the ITO layer 66 on the thin glass piece in contact with the liquid crystal layer 67. As in typical ICFLCDs, there is also included a patterned conductive layer 68 which defines the pixels and a silicon substrate 70.

Figure 7:
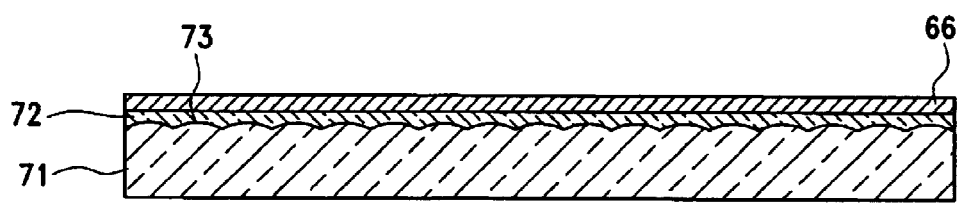
FIG. 7 illustrates an alternate construction of an ICFLCD and lens assembly.

An alternate construction is illustrated in FIG. 7. Here, a thick piece of glass 71 is provided, and a thin piece of glass 72 is provided, the two pieces having a different index of refraction. If the thick piece has an index greater than that of the thin piece, then convex lenslets 73 are formed into its surface, and the thin piece in turn has exactly mating concave lenslets are formed into its surface, for example, by etching. The two pieces are mounted face to face as shown. If the thick piece had an index less than that of the thin piece, then the positions of the convex and concave surfaces would be reversed. The ITO layer 66, as before, is placed on the opposed flat surface of the thin piece, with the ICFLCD liquid crystal layer of the ICFLCD (not shown in FIG. 7) adjacent the ITO layer 66.

Other methods of creating flys eye lenses on one surface of a thick piece of glass and mating a thin piece to it, or of forming flys eye lens arrays within a piece of glass, will be evident to those in the microlens fabrication industry.

Figure 8:
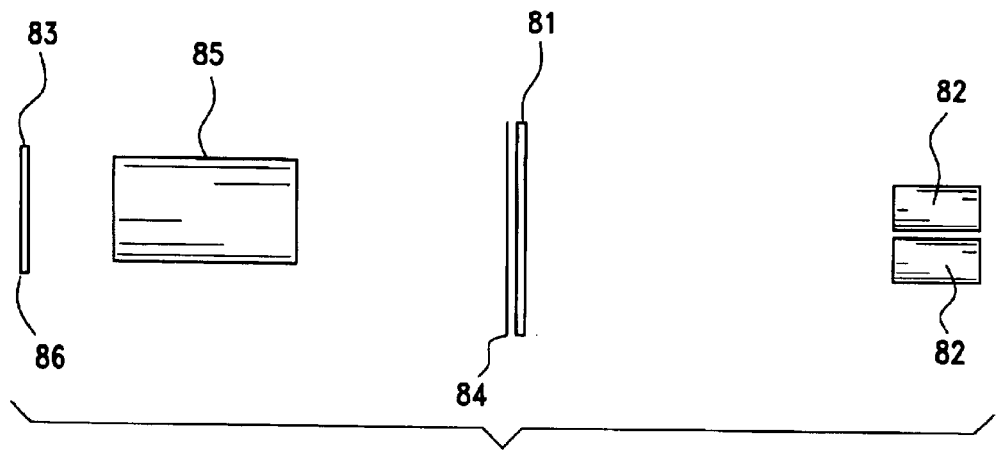
FIG. 8 illustrates a partial illumination and optical system for this invention.

In situations where the lenslets cannot be placed sufficiently close to the light valve pixels for one reason or another, one can use a flys eye lens that is separated by a considerable distance from the light valve and use a relay lens to focus light from the flys eye lens onto the pixels of the LCD. Such an arrangement is shown in FIG. 8.

The flys eye lens 81 forms light spots by focusing light from light source 82, but in this arrangement there is a considerable distance between the flys eye lens 81 and the reflective light valve (ICFLCD) 83. The light spots in this case are still formed in a plane 84 that is very close to the flys eye lens array 81. A relay lens 85, which is ideally a multi-element lens assembly with very low off axis distortion and aberration properties, is placed between the flys eye lens array 81 and the light valve 83, in such a way that the light spots formed by the flys eye lens array are imaged at the proper locations within the pixels of the light valve 83. In this case, it is usually best to image the spots directly onto the reflective surface 86 of the light valve.

There are many possible light sources to use for illumination in this type of system. LEDs, for example, have sufficiently rapid turn on and turn off times for use in this type of application and sufficient brightness for use in head mounted displays. These can be positioned in front of the flys eye lens array 81 similar to FIG. 2. LEDs are made by several different manufacturers. One made that is particular suited to this application is the Alphalight series made by Teledyne. These lamps use an array of red, green, and blue miniature lamps around a central reflective cavity. By turning first the red, then the green, and then the blue sets on and off, one can make the square central cavity flash red, green, and blue. Four or more LEDs of this type can be used to produce spots within the sub-pixel regions that turn on and off and also turn color from red to green to blue for field sequential color imaging.

Certain fluorescent lamp phosphors can be made to flash on and off with sufficient speed for use in this application. Banks of linear red, green, and blue lamps have been used to create colored lines within pixels in a previously build field sequential color direct view LCD system, as described in the paper "Development and Preliminary Evaluation of Field Sequential Color LCD Free of Color Breakup" published in the Society for Information Display International Symposium Digest of Technical papers. Volume XXV (Publisher: Society for Information Display, Santa Ana, Calif.).

It is also possible to create flashing light sources that change color from red to green to blue using steady light sources, such as halogen lamps, shining through an array of shutters and rapidly changing filters that alternately transmit red, then green, and then blue light, thus creating an array of lighted regions that sequentially turn red, green, and blue, and then off. Such color filters are made by Displaytech and by Colorlink. A separate shutter, for example a liquid crystal shutter, is typically required to cause each of the light emitting regions in the array to turn off (become opaque) after each flash sequence or prior to a color change.

All of these lighting technologies can be used either to create conventional field sequential color illumination or to create interleaved patterns of red, green, and blue lines or spots for breakup-free field sequential color. When employed in the present invention, enhanced resolution is achieved.

Figure 9:
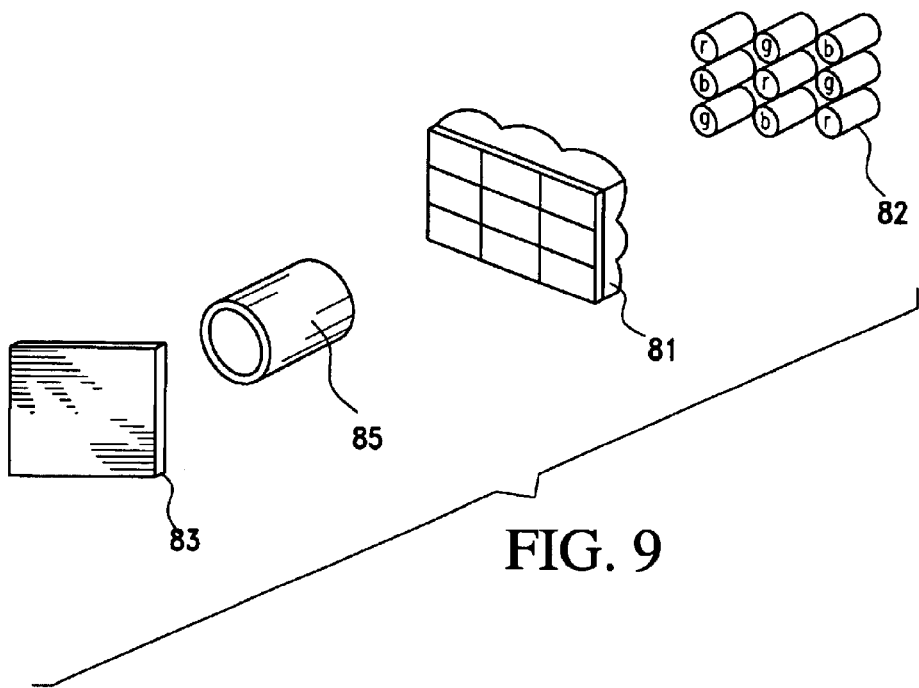
FIG. 9 is a perspective view of the system of FIG. 8.

FIG. 9 illustrates another arrangement where the light source 82 has the form of an array of nine lamps (LEDs), forming three rows of three lamps, one lamp in each row being colored red, one green, and one blue.

In U.S. Pat. No. 5,428,366, the disclosure of which is hereby incorporated by reference, a field sequential color illumination method was described whereby color could be created on a monochrome light valve without creating color breakup. This was accomplished by imaging red, green, and blue light spots or lines within pixels of the light valve, in such a way that spots of different colors are imaged simultaneously within different pixels of the light valve. This general method can be implemented using the optical arrangements of this invention while achieving enhanced resolution.

A field sequential color image is normally created on an LCD by using lighting systems that are caused to emit red, green, and blue light, in succession during subsequent fields, while the pixel transparencies are changed to create red, green, and blue color components of an image in succession. The lighting systems used to accomplish this usually involve either steady lamps behind rotating color filters, or flashing LEDs.

In FIG. 9, the LEDs can be made to flash on and off in sequence. In order to avoid color break up, patterns of red, green, and blue points or lines are imaged into the pixels in such a way that:

a) During each flash, red, green, and blue light is directed simultaneously to different, nearby pixels on the LCD, and b) During each three or multiple flash sequence, each pixel receives red, green, and blue light during successive flashes.

Figures 10A, 10B, 10C:
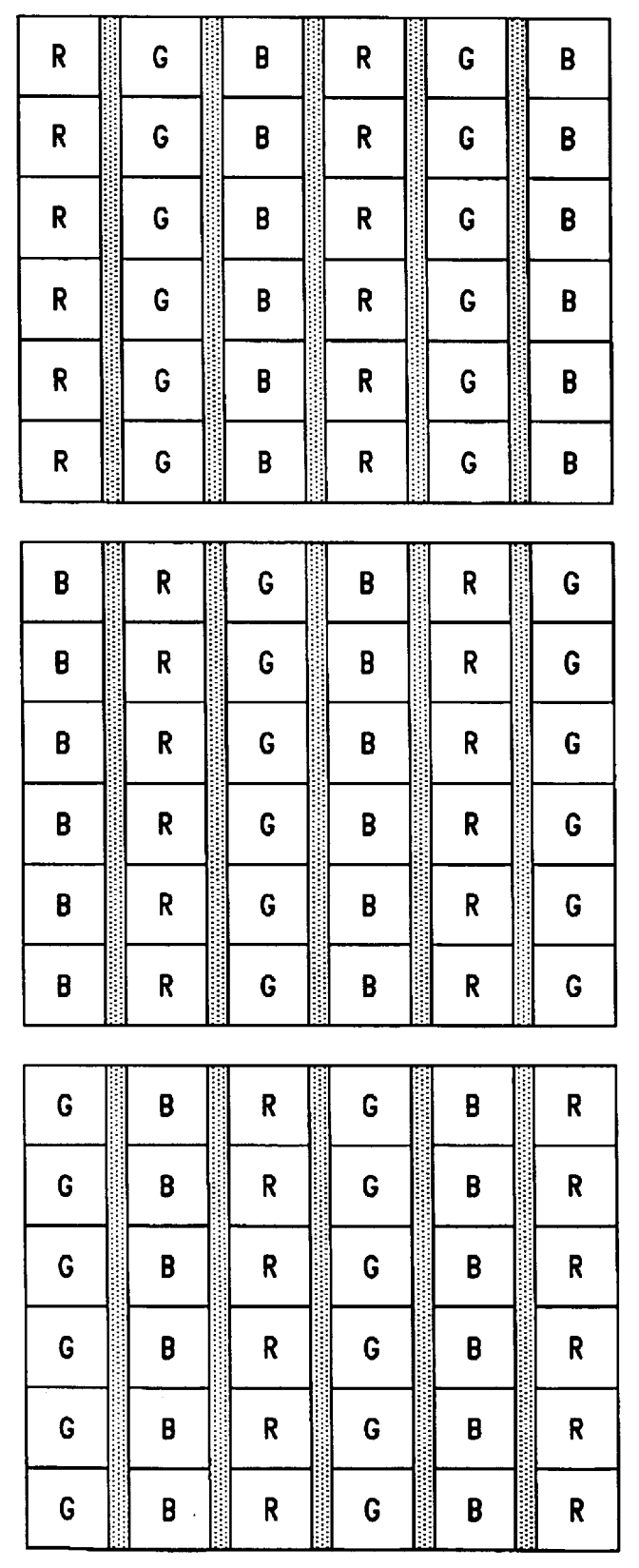

More specifically, in FIG. 9, each row of lamps is flashed on in sequence, and the sequence repeats steadily from top to bottom (or in some other order). The lenslets image light from the lamps into a series of repeating red, green, and blue lines immediately in front of each lenslets (plane 84 of FIG. 8) as each row of lamps flashes. The relay lens 85 in turn focuses light from the array of spots focused by the lens onto the pixels of the reflective light valve 83. The lines are focused so that during each flash, one line is focused into each of the pixels of the light valve 83. If each row of lamps flashes in sequence from top to bottom, the pattern of lines shown in FIGS. 10a, 10b, and 10c appear in sequence. Just before each lamp row is flashed, the light valve is scanned and each pixel caused to display one pixel of transparency information for the image color component of the color that is to be imaged into that pixel.

Figure 11:
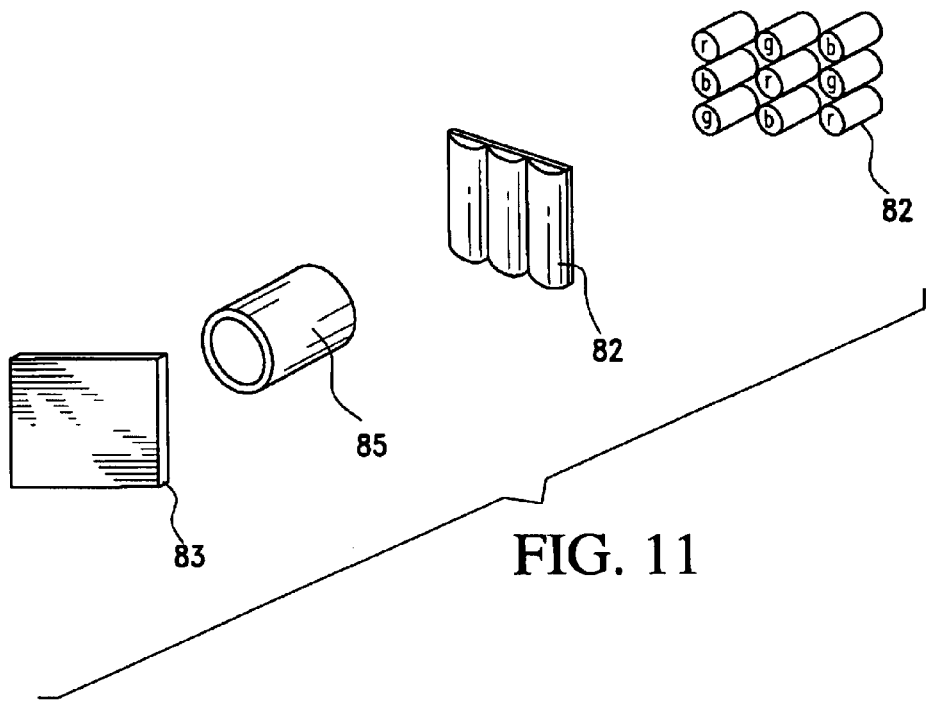
FIG. 11 illustrates a partial illumination and optical assembly similar to FIG. 9 but employing a lenticular lens.

Ideally, the flys eye lens 81 may be replaced by a lenticular lens 82, as shown in FIG. 11, with its long cylindrical lenslets oriented with their long axes in the direction perpendicular to the rows of lamps and the rows of the light valve 83.

Figure 12:
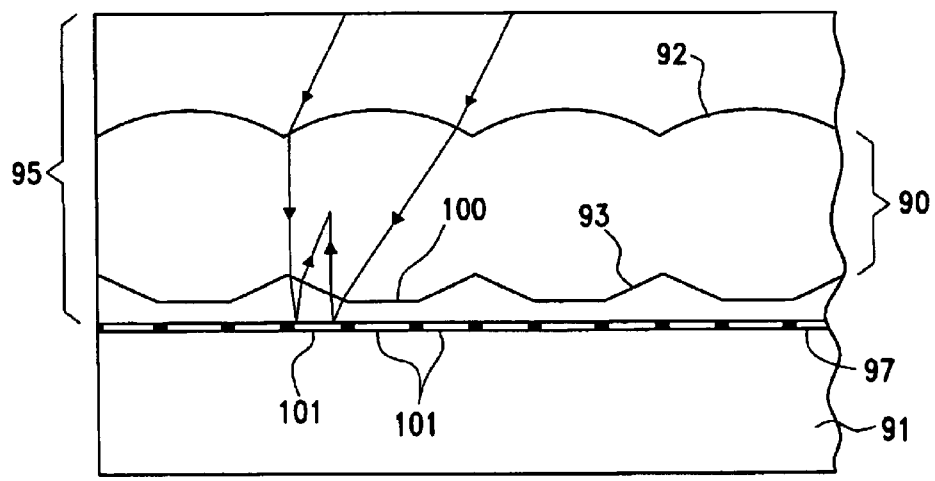
FIG. 12 is a partial cross-sectional view of another construction of an ICFLCD and lens assembly.

FIGS. 12 to 16 illustrate another embodiment of the invention that permits imaging of changing patterns of colored lines into adjacent pixels. This embodiment employs a lens array positioned close to the pixels. Referring to FIG. 12, a lenticular lens array 90 is placed very close to the pixels 101 of the light valve 91. This lens array 90 will generally have two surfaces: an outer (farthest from the pixels) concave surface 92 and an inner (nearest the pixels) multifaceted surface 93. For the described embodiment, each lenslet 100 at the multifaceted surface 93 has three flat facets as shown, one in the center parallel to the pixel surface, and one on either side angled outwardly. This lens array 90 may be built into the front (cover) glass 95 of the ICFLCD 91, and composed of material possessing an index of refraction greater than that of the surrounding glass 95. The pitch of the lenslets 100 will generally be equal or nearly equal to three times the pixel pitch, so that one lenslet 100 is positioned in front of each group of three pixels 101. Each of the facets on the inner multifaceted surface of a lenslets is placed in front of one column of pixels. In other words, each pixel 101 is matched with one of the three facets on lenslet 100. The concave outer surface 92 preferably has a curvature such that the focal plane for light entering it from an infinite distance source would be focused at some distance beyond the ICFLCD pixels and reflective layer 97; a distance of 1.4X the distance to the ICFLCD reflective layer is optimal in most circumstances.

Figure 13:
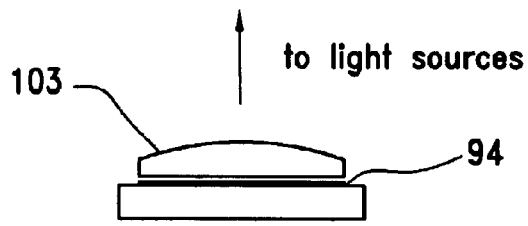
FIG. 13 illustrates the assembly of FIG. 12 with a collimating lens.
Figure 14:
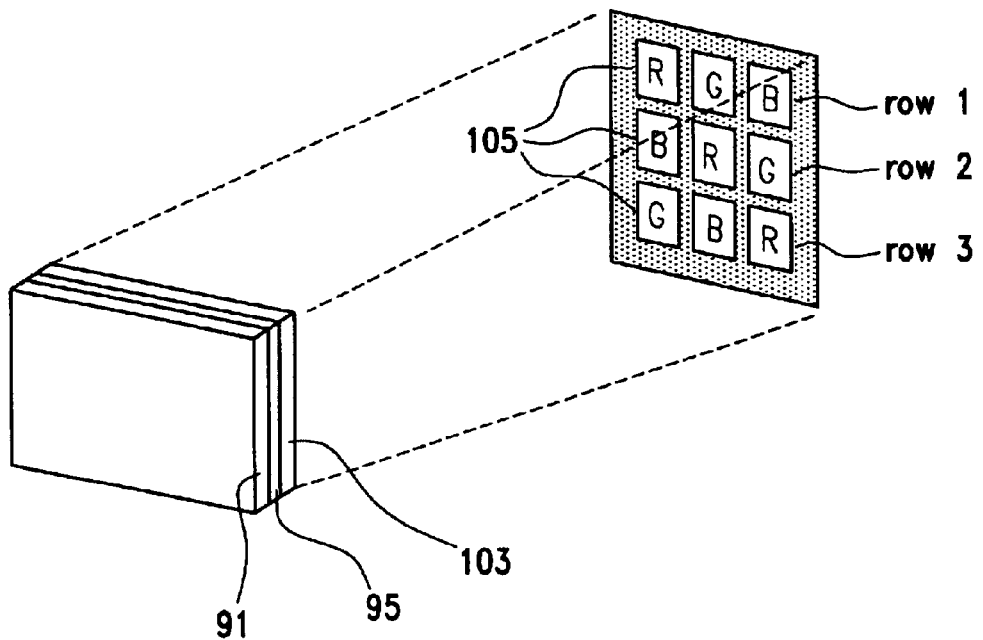
FIG. 14 illustrates a partial illumination and optical system employing the assembly of FIG. 12.

Three sets of light sources are mounted at a certain distance from the lenticular lens array 90, as shown in FIG. 14. In order to obtain efficient light throughput, it is generally preferred, as illustrated in FIG. 13, for a single collimating lens element 103 to be placed directly in front of the ICFLCD front cover glass 95. This collimating lens 103 preferably possesses a focal length equal to the distance to the plane where the light sources 105 are located. Thus, from the side of the lens 103 opposite the light sources 105, the light sources 105 would appear to be at infinity, and the light coming from them would be collimated to some degree by this lens.

The size and/or spacing of the light sources 105 is generally selected so that light emitted by any of the sources in the right column of the illustrated 3×3 array is focused into the pixel columns to the left side of each lens array element—this is illustrated by the arrows in the diagram of FIG. 12. Likewise, light from any of the sources in the central column would be focused into the pixel columns that are centered behind the lenslets, and light from any of the sources in the left column would be focused into the pixel columns to the right side of each lens element. To create a changing pattern of red, blue, and green lines necessary for breakup free field sequential color, each row of the array in FIG. 14 flashes on, then off, repeatedly, in succession; for example row 1 followed by row 2 followed by row 3, then back to row 1 again.

In this design, light from the sources 105 is actually focused by the lenses toward a plane about 1.4 times farther than the ICFLCD reflective layer 97. By the time the light hits the reflective layer, the wedge of light is focused down so that it hits only one column of pixels 101, as seen in FIG. 12. The light is reflected by the reflective layer so that it is focused into a thin line in a plane within the lens 100 part way between the lens and the reflective layer, as shown. Upon exiting the front lens surface 92 again, the light is focused so that, as seen from the other side of this surface, it seems to come from a spot located on a plane at the same distance behind the lens surface as the reflective layer is in reality.

Figure 15:
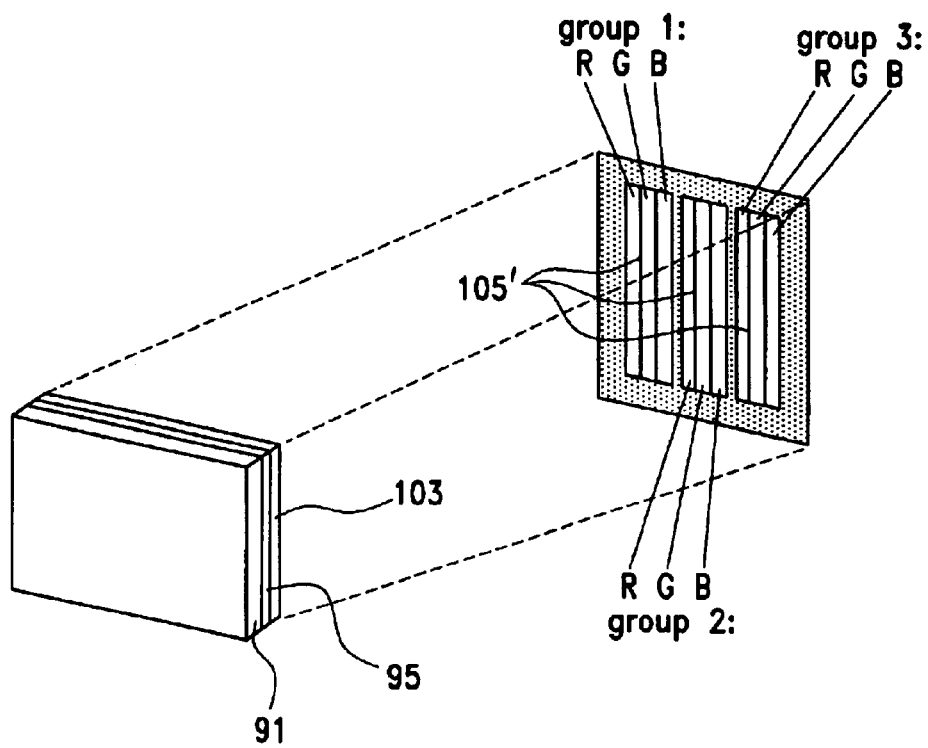
FIG. 15 illustrates an alternate partial illumination and optical system.

Variations on this design are, of course, possible. For example, the lenticular lens described above could be replaced by a flys eye lens, embedded in the ICFLCD front glass 95, with one flys eye element place in front of each group of nine pixels. The faceted surface, however, should still consist of linear structures running the length of the ICFLCD pixel columns or rows from top to bottom. In this case, the light sources should be linear in shape and long enough to ensure that light reaches all three rows of pixels behind each lenslet. In such a case, the three sets of light sources may be arranged in the pattern shown in FIG. 15. In FIG. 15 three groups of linear red, green, and blue sources 105' are shown, spaced apart horizontally. In operation, after the first ICFLCD scan, the red source in group 1, the green source in group 2, and the blue source in group 3 would come on at once, then turn off. After the next scan, the green source in group 1, the blue source in group 2, and the red source in group 3 would flash on together, then turn off. After the third scan, the blue source in group 1, the red source in group 2, and the green source in group 3 would turn on together, then turn off. This cycle would then repeat continuously.

It is also possible, as in previous configurations discussed, to use negative lenses instead of positive lenses made with glass or some other material possessing an index of refraction less than that of the surrounding glass it is embedded in. The negative lens equivalent of the lens array shown in FIG. 12 is illustrated in FIG. 16.

Figure 16:
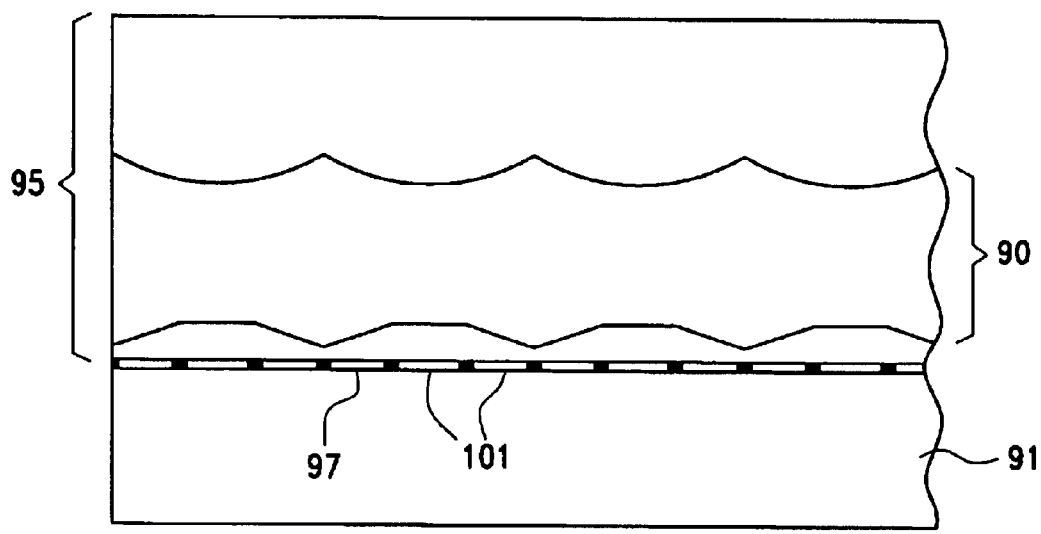
FIG. 16 illustrates an alternate ICFLCD and lens assembly.

Yet another variation involves using a convex surface in place of the three faceted surface shown in FIG. 12, or a concave surface in place of the three faceted surface shown in FIG. 16, to direct light into the pixels and then direct it out again.

The light sources shown can be of several types. For example, groups of LEDs can be used for head mounted applications. Rows of LEDs or groups of linear fluorescent lamps can be used as the linear sources shown in FIG. 10. Bright white sources such as halogen or arc lamps shining through changeable electronic color filters (such as products made by Colorlink and Displaytech) and electronic liquid crystal shutters can be used to create very bright groups of blinking light sources for projection applications.

In all cases when illuminating an ICFLCD from different point like or linear light sources, the timing of the illumination and ICFLCD scan sequence may proceed in a manner similar to the following. The process starts with the illumination off, and each subsequent scan and illuminate period starts with the illumination off. First, the rows of pixels on the ICFLCD are addressed row by row and a voltage is applied across them in order to cause the liquid crystal molecules within the LCD layer to start rotating to turn each of the pixels on or off as necessary. These scan processes require a time period T1 to complete—T1 can range widely, for example, from 10 $\mu s$–180 $\mu s$ depending on the ICFLCD and its resolution. Next, during a time period T2, all the pixels on the ICFLCD, including the last ones addressed, complete their change to on or off. This time period is usually in the range of 75 $\mu s$–100 $\mu s$, but again may vary depending on the specific ICFLCD, and there also may be significant variation based on temperature differential. In this regard, maintaining an ICFLCD near the high end of its operating temperature range can reduce this time period considerably. Next, the illumination source appropriate for the image being shown turns on at the end or near the end of time period T2. This illumination source may be any of the red, green, or blue sources displaying light at a certain position and of a certain intensity for the creation of light spots or lines and gray scale formation, as necessary. The light source is on for a period of time T3, the exact length of which depends on the amount of time available before the next image for the next field has to start forming; in the case of an ICFLCD that has to create gray scale by the time varying light source method, this time period may be on the order of 90 $\mu s$ or less. If the ICFLCD has analog gray scale capability, then T3 could be much longer, on the order of several hundred $\mu s$. At the end of time period T3, the illumination turns off. The end of T3 occurs at or close to the beginning of the next period T1, when the ICFLCD pixels are addressed again. The above process repeats continuously while images are being shown on the display.

It is noted that the embodiments described above in reference to FIGS. 9 to 16 will generally include a partially reflecting mirror positioned between the ICFLCD/liens assemblies and the light sources, as in the embodiments illustrated in FIGS. 3 and 4.

Gray scale may be created for ICFLCDs and similar reflective light valves employed in this invention by methods generally known in the art in relation to transmissive LCDs.

Figure 17:
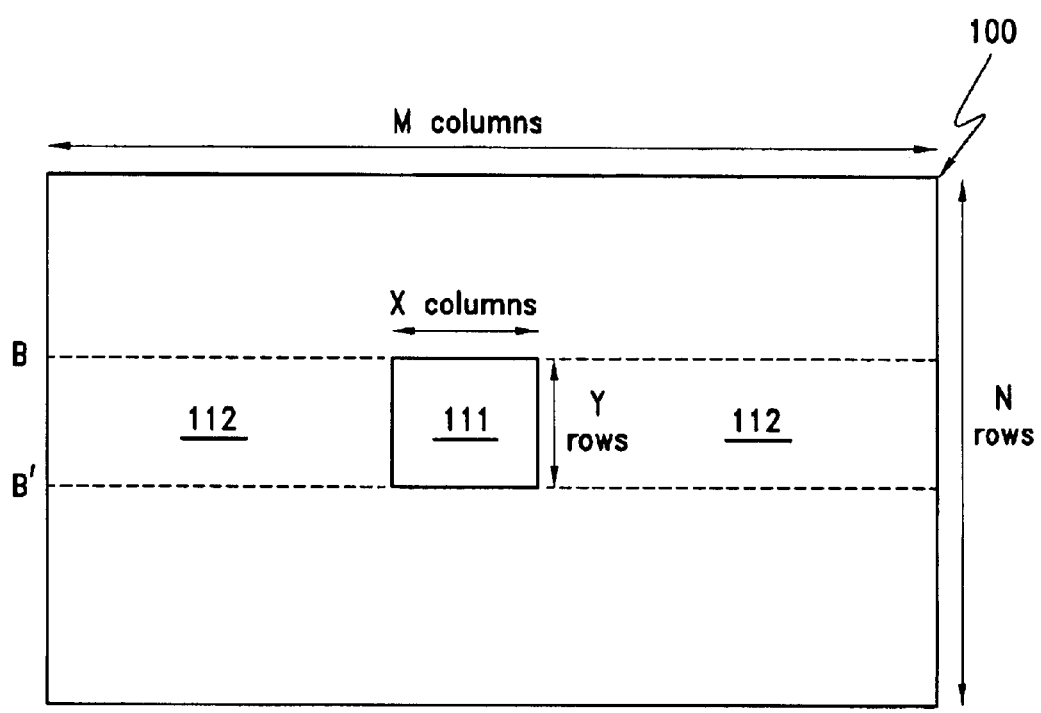
FIG. 17 illustrates a light valve having rows and columns of pixels.

It is possible to produce increased resolution only in a small area of the display, generally in the vicinity of the gaze point of the observer, in order to reduce the amount of data and the bandwidth needed to display the images. This is accomplished in the following manner, with reference to FIG. 17. Subregions of pixels of an M×N resolution light valve 110 are illuminated by light sources as described previously. As the light sources flash and the light spots are formed sequentially, the pixels within the smaller X×Y resolution area 111 are caused to change their transparency before each spot is imaged, in order to create an image formed by the spots instead of the pixels as described previously. Outside the area 111, the pixels always stay at the same level of transparency throughout a complete spot flash cycle during which all the subregions within each pixel are illuminated once. Thus, the image displayed outside the area marked 111 has a lower resolution, and is formed by the pixels of the light valve itself, instead of the light spots.

One specific way to accomplish this is simply to scan the entire light valve (for example, address each row in sequence from the top to the bottom) prior to the first illumination period, and change the state of each pixel to on, off, or an in between gray level, as is appropriate. An illumination cycle will be assumed, for the sake of the description of this embodiment, to be composed of a four flash cycle during which four lamps of the same color are used to illuminate appropriate gray level to display the part of an M×N image that is outside the area 111. These pixels stay at the same level of transparency throughout a complete four spot flash cycle. On the first scan, the pixels within area 111 are made to change reflectivity appropriate to displaying the pixels, formed by the light spots, of a 2X×2Y image composed of the light spots generated during the four flash cycle. During scans 2–4, only the pixels within the area 111 are changed to create an image with 2X×2Y resolution within area 111, where X is the number of pixel columns within area 111 and Y is the number of pixels rows within area 111. This 2X×2Y image would normally be a high resolution section of the larger image in the area surrounding it outside the area 111. The other pixels, being unchanged for the scans 2–4, would display an M×N resolution image outside the area 111. The process repeats during each four flash cycle. Most of the miniature reflective light valves, such as ICFLCDs, typically possess pixels that will remain in whatever state they are placed in by scanning long after they are addressed—in other words, it is therefore not necessary to address pixels that do not change between one scan and another. Since only pixels within the area 111 change during every scan, it is only necessary to scan the area between lines B and B' during the second, third, and fourth scan, and only necessary to address and change pixels within the area 111 itself during the second, third, and fourth scans. This method allows faster image creation because the repeated scanning during each frame only occurs around the area 112 (i.e., the area between lines B and B' and surrounding area 111) where the smaller high resolution image is being formed. In many situations one can use this speed advantage to perform more scans within a given time period and illuminate more subregions within each pixel than is possible if the whole LCD were scanned.

It is also possible to move or resize the area 111 where the higher resolution image is being formed in response to user control or automatic control. For example, the high resolution area can be made to coincide with a window that can be freely moved and resized by the user in the manner normally associated with the Microsoft Windows operating system, Linux, Apple Macintosh operating systems, and others. For example, one could move the window to reveal high resolution images in certain windows, if those specific images required higher resolution to reveal details clearly. Conversely, one could cause the area within a window to contain the low resolution image and the area outside to contain a high resolution image. It is also possible to cause area 111 to move in response to input from an eye tracker, as is often used in head mounted display systems. In such a case, the eye tracker would provide information on the observer's gaze point on the screen, and move area 111 so that it is always centered with respect to the gaze point. The area 111 would in this case display a high resolution section of the surrounding low resolution image on the rest of the display.

In all cases, this movement may be accomplished by changing the location of lines B and B' within which multiple scans may occur during each frame, and region 111, within which the pixels are changed several times during each frame to create a 2X×2Y high resolution image.

It is noted that this feature, in which high resolution is displayed only within a certain area of interest whose location and size is controlled by the user or by some automatic means, may be applied to a transmissive display as well as a reflective display that employs the techniques described in this application or the similar variations described in U.S. Pat. No. 5,036,385.

While the invention has been described with reference to preferred embodiments, it will be understood by those skilled in the art that various changes may be made and equivalents may be substituted for elements thereof without departing from the scope of the invention. In addition, many modifications may be made to adapt a particular situation of material to the teachings of the invention without departing from the scope of the invention. Therefore, it is intended that the invention not be limited to the particular embodiments disclosed as the best mode contemplated for carrying out this invention, but that the invention will include all embodiments falling within the scope and spirit of the appended claims.

What is claimed:

1. A display device comprising:
   a reflective light valve having a pixel layer, a reflective layer, and a front transparent layer including a plurality of front lenses, a front lens situated in front of each pixel;
   a light source at the opposite side of the transparent layer from the liquid crystal layer that directs light to the light valve; and
   a lens positioned between the light valve and the light source, said lens directing light from the light source to the light valve and the light valve directing light to viewing optics.

2. The device of claim 1, wherein the light valve is an integrated circuit ferroelectric liquid crystal device, ICFLCD, having an array of addressable pixels.

3. The device of claim 1, wherein the front lenses are lenslets, each lenslet positioned in front of each pixel of the light valve.

4. The device of claim 3, wherein the pixel layer is a liquid crystal material arranged beneath the front transparent layer.

5. The device of claim 4, wherein the lenslets have a focal length equal to approximately twice the distance between the lenslet surface and the reflecting layer of the light valve.

6. The device of claim 1, wherein one or more of the front lenses is selected from the group consisting of a flys eye lens arrays and lenticular lens arrays.

7. The device of claim 1, further comprising a reflector positioned between the light source and the light valve.

8. The device of claim 1, comprising a prism including a partially reflective surface disposed between the light source and the light valve.

9. The device of claim 1, comprising a reflective light valve having a pixel layer; a light source at the opposite side of the transparent layer; and a lens positioned between the light valve and the light source.

10. The device of claim 1, comprising a rotating color filter wheel having discrete transparent sections of different colors disposed between light source and the viewing optics.

11. The device of claim 10, further comprising a rotating prism located between the light source and the viewing optics.

12. A The device of claim 11, comprising means for synchronizing the rotation of the color filter wheel and the prism.

13. The device of claim 11, comprising a bundle of optical fibers having opposite bundle ends directing the beam of light to the light valve.

14. The device of claim 1, wherein the lens is a lenticular lens including lenslets, and wherein inner surfaces of the lenslets are disposed towards the light valve include three facets said lenslets having a focal length equal to approximately twice the distance between the lenslet surface and the reflecting layer of the light valve.

15. The device of claim 14, wherein each facet is aligned with a single pixel of the light valve.

16. The device of claim 1, wherein the light valve comprises a digital light processor.

17. The device of claim 1, wherein the light source comprises red, green and blue light sources.

18. The device of claim 17, comprising means for synchronizing the red, green and blue light sources an the light valve.

19. A head mounted display system comprising:
   a right eye light valve and a left eye light valve mounted in a head mounted display, each light valve including an array of addressable pixels, each light valve comprising at reflective light valve having a pixel layer, a reflective layer, and a front transparent layer including a plurality of front lenses, a front lens situated in front of each pixel; and
   a light source that provides a plurality of focused light beams at different locations to each of the light valves, each of the light beams directing light onto a different area of the pixels in the array of addressable pixels;
   wherein the focused beams are provided alternately to the light valves, and each light valve is addressed while receiving no light.

20. The display system of claim 19, wherein the light source is external to the head mounted display, and comprising optical fiber directing light from the light source to the light valves.

21. The display system of claim 20, comprising a rotating color filter wheel having discrete transparent sections of different colors disposed between light source and the viewing optics.

22. The display system of claim 21, further comprising a rotating prism that receives light from the color filter wheel and directs a beam of light.

23. The device of claim 22, comprising means for synchronizing the rotation of the color filter wheel and the prism.

24. The device of claim 22, comprising a bundle of optical fibers having opposite bundle ends directing the focused beam of light to the light valve.

25. A method of generating color images of high resolution, comprising:

sequentially directing light of different colors from a light source to pixels on a reflective light valve, said reflective light valve comprising a pixel layer, a reflective layer, and a front transparent layer including a plurality of front lenses, a front lens situated in front of each pixel; and addressing the pixels of the light valve to modulate intensity of light to create different color components of an image in succession.

26. The method of claim 25, wherein the step of sequentially directing light of different colors further comprises turning the colored light on and off in succession, and changing the transmissivity of the pixels to create red, green, and blue color components of the image in succession.

27. The method of claim 26, comprising focusing light from the light source to the pixels on the light valve, and directing light from the light valve to viewing optics.

28. The method of claim 27, wherein the light valve is an integrated circuit ferroelectric liquid crystal device having an array of addressable pixels.

29. The method of claim 28, wherein the ICFLCD has a pixel response time of 0.1 ms or shorter.

30. The method of claim 28, wherein the front lens is a flys eye lens or lenticular lens adjacent the ICFLCD.

31. The method of claim 25, comprising directing light from the light source through a rotating color filter wheel having discrete sections of different color transparencies.

32. The method of claim 31, comprising directing light from the color filter wheel to a rotating prism and focusing a beam of light.

33. The method of claim 32, comprising synchronizing rotation of the color filter wheel and the prism and sequentially providing focused beans of light of different color transparencies.

34. The method of claim 33, comprising sequentially directing the focused beams of light of different color transparencies to bundle ends of bundles of fibers, and directing focused beams of light from opposite ends of the bundles to the pixels of the light valve.

35. The method of claim 25, comprising directing light of different colors from the light source to addressable pixels of a right eye non-transmissive light valve and to addressable pixels of a left eye non-transmissive light valve, and addressing the pixels of both the right eye and left eye light valves are addressed to modulate intensity of light to create different color components of an image in succession, and providing light alternately to the light valves and addressing each light valve while receiving no light.

36. The method of claim 35, wherein the right eye and left eye light valves are disposed in a head mounted display.

37. The display device of claim 1 in which the reflective light valve comprises a plurality of addressable pixels, each pixel comprising a plurality of pixel areas; and the lens directs light from the light source to a different one of the pixel areas of each one of the pixels on the light valve and the light valve directs light to viewing optics.

38. The display device of claim 1, wherein the front lens is a flys eye lens or lenticular lens.

39. The device of claim 1, wherein an outer surface of the front lenses is concave.

40. The device of claim 1, wherein an outer surface of the front lenses is convex.

41. The device of claim 1, further comprising a reflector positioned between the light source and the light valve, said reflector directing light from the light valve to viewing optics.

42. The device of claim 1, comprising a prism including a partially reflective surface disposed between the light source and the light valve.

43. The device of claim 1, wherein the light valve is an integrated circuit ferroelectric liquid crystal device, ICFLCD, and the front lens is a flys eye lens array or a lenticular lens array spaced from the ICFLCD.

44. The device of claim 43, comprising a relay lens which is disposed between the ICFLCD and the flys eye or lenticular lens array.

* * * * *